(12) United States Patent
Mori et al.

(10) Patent No.: US 7,690,831 B2
(45) Date of Patent: Apr. 6, 2010

(54) SURFACE LIGHT SOURCE DEVICE

(75) Inventors: Akihiro Mori, Kikuchi-gun (JP);
Toshiyuki Yoneda, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 45 days.

(21) Appl. No.: 11/176,655

(22) Filed: Jul. 8, 2005

(65) Prior Publication Data
US 2006/0007704 A1    Jan. 12, 2006

(30) Foreign Application Priority Data
Jul. 8, 2004    (JP)    ............................. 2004-201241

(51) Int. Cl.
*F21V 7/04*    (2006.01)
(52) U.S. Cl. .................. 362/621; 362/612; 362/628
(58) Field of Classification Search ............. 362/612, 362/615, 621, 624, 627, 628; 349/61–63, 349/65, 69
See application file for complete search history.

(56) References Cited

U.S. PATENT DOCUMENTS

| | | | |
|---|---|---|---|
| 4,714,983 A * | 12/1987 | Lang ........................... | 362/27 |
| 5,070,431 A * | 12/1991 | Kitazawa et al. ............. | 362/601 |
| 5,769,521 A * | 6/1998 | Osawa et al. .................. | 362/27 |
| 6,499,865 B1 * | 12/2002 | Wada .......................... | 362/307 |
| 6,779,902 B2 | 8/2004 | Cha et al. | |
| 2002/0191387 A1 | 12/2002 | Cha et al. | |
| 2003/0184690 A1 * | 10/2003 | Ogiwara et al. ............... | 349/61 |
| 2003/0193631 A1 * | 10/2003 | Chiou ......................... | 349/65 |
| 2004/0136173 A1 * | 7/2004 | Tsai ............................ | 362/31 |
| 2004/0174694 A1 | 9/2004 | Huang et al. | |

FOREIGN PATENT DOCUMENTS

| | | |
|---|---|---|
| JP | 2002-107721 | 4/2002 |
| JP | 2002-298630 A | 10/2002 |
| JP | 2004-029627 A | 1/2004 |
| JP | 2004-119031 A | 4/2004 |
| TW | 59426 B | 6/2004 |

OTHER PUBLICATIONS

Notification of Reason for Refusal from JPO dated May 12, 2009 in Japanese Patent Application No. 2004-201241 and English Translation.

* cited by examiner

*Primary Examiner*—Jason Moon Han
(74) *Attorney, Agent, or Firm*—Buchanan Ingersoll & Rooney PC

(57) ABSTRACT

A surface light source device includes two or more point light sources that are arranged linearly, a light guide plate having an incident surface on which light emitted from each of the point light sources shines, for outputting input light from a front surface thereof, and light diffusing means provided on a back surface of the light guide plate, for diffusing light. The incident surface of the light guide plate is inclined toward a back side.

4 Claims, 11 Drawing Sheets

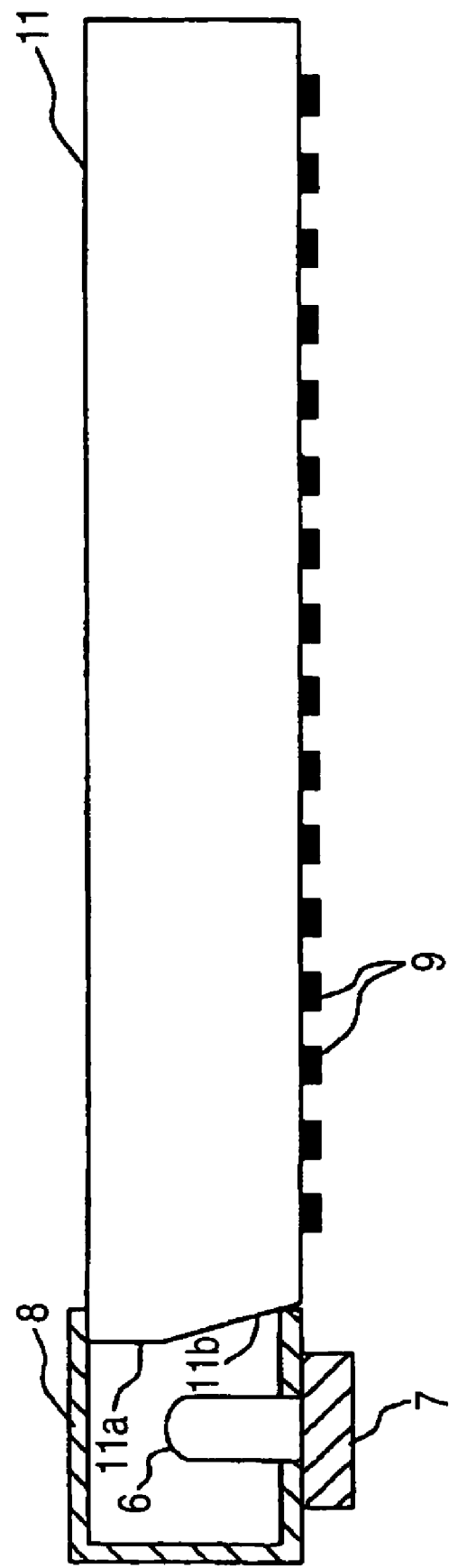

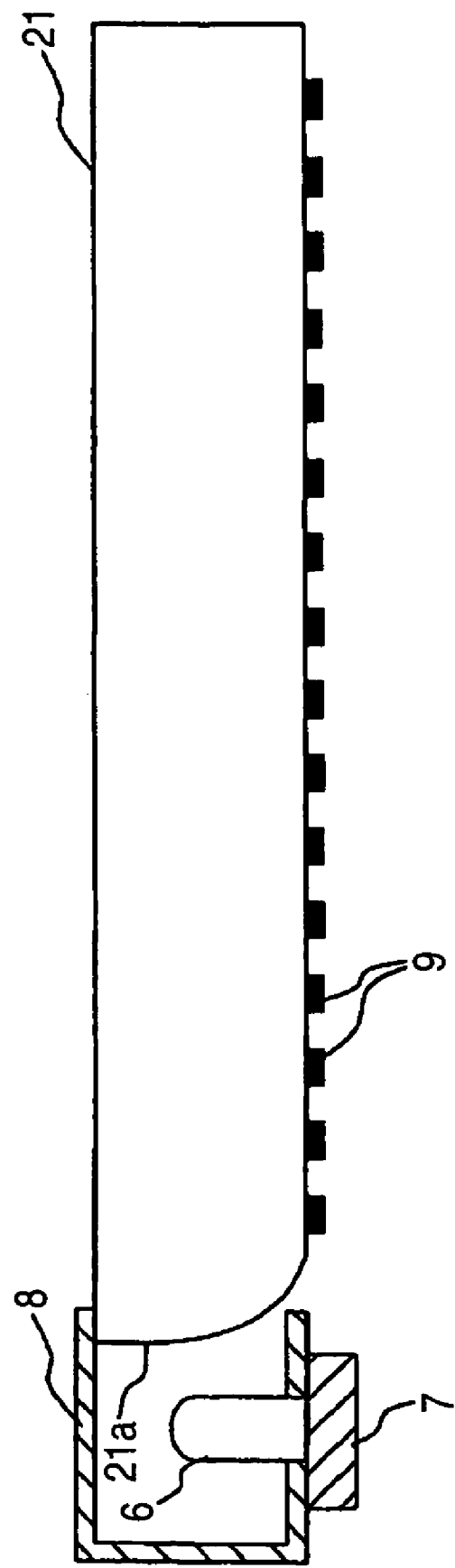

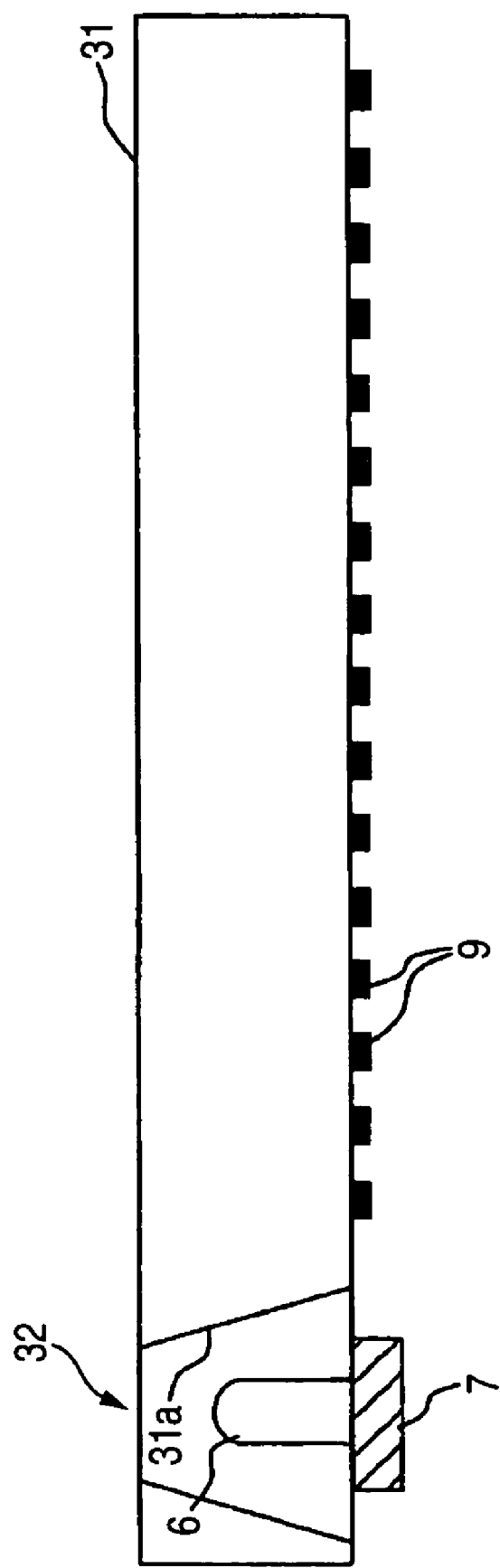

SURFACE LIGHT SOURCE DEVICE

BACKGROUND OF THE INVENTION

1. Field of the Invention

The present invention relates to a surface light source device and, more specifically, to improvement of a surface light source device having a light guide plate for outputting, from its front surface, input light that is input through its incident surface from plural point light sources that are arranged linearly.

2. Description of the Related Art

Surface light source devices are known that illuminate a display panel such as a liquid crystal panel over its entire display area with uniform light. Surface light source devices of this type are classified into a direct type in which a light-emitting element(s) is disposed in the rear of a body and a side light type (also called an edge light type) in which a light-emitting element(s) is disposed in a side portion of a body. Further, side-light-type surface light source devices are classified into a type in which a linear light source such as a CCFL (cold cathode fluorescent lamp) is used as a light-emitting element and a type in which point light sources such as LEDs (light-emitting diodes) are used as light-emitting elements. Side-light-type surface light source devices that employ plural point light sources as light-emitting elements have a problem that luminance unevenness or color unevenness may occur in a region close to the point light sources in their arrangement direction. (See, for example, JP-A-2002-107721.)

FIG. 11 is a sectional view showing the structure of an important part of a conventional surface light source device, and shows a side-light-type surface light source device having a light guide plate 101 that outputs, from its front surface, input light that is input through an incident surface 101a from plural LEDs 102 that are arranged linearly. This surface light source device is composed of a light guide plate 101 and a light source unit that is opposed to one end surface of the light guide plate 101. The light guide plate 101 is a transparent flat plate made of an acrylic resin or glass and has the incident surface 101a on which light coming from the light source unit shines. Light that shines on the incident surface 101a travels through the light guide plate 101 and is output through its front surface. The back surface of the light guide plate 101 is formed with a diffusion pattern 105 for diffusing light traveling through the light guide plate 101. That is, light that has been diffused by the diffusion pattern 105 (i.e., diffused light) is output through its front surface. The light source unit is composed of plural LEDs 102, a board 103 on which the LEDs 102 are formed so as to be arranged linearly, and a reflector 104 for outputting light coming from the LEDs 102 to the light guide plate 101 by reflecting it.

In the above side-light-type surface light source device, the distance between the point light sources (LEDs 102) and the incident surface 101a of the light guide plate 101 cannot be increased beyond a certain limit because it is necessary that what is called a frame area be kept narrow. As a result, light beams emitted from the respective point light sources are not mixed together sufficiently in their arrangement direction when they reach the incident surface 101a. Part of the input light originating from each point light source is directly diffused by a portion C, in the vicinity of the light source unit, of the diffusion pattern 105 and is then output through the front surface of the light guide plate 101. Since light beams coming from adjoining point light sources are output after being diffused in the vicinity of the light source unit without being mixed with each other sufficiently, luminance unevenness (i.e., a bright/dark pattern) may occur in the arrangement direction of the point light sources in a region, in the vicinity of the light source unit, of the front surface of the light guide plate 101. That is, bright portions are seen in regions close to the point light sources and dark portions are seen in regions between the point light sources.

In particular, where LEDs that emit light beams of plural colors (R (red), G (green), and B (blue)) are used as point light source, light beams emitted from the point light sources of the different colors are not mixed together sufficiently and hence color unevenness may occur in addition to luminance unevenness. Luminance unevenness or color unevenness results in a problem that the display quality of a display panel is lowered.

As described above, conventional surface light source devices have the problem that luminance unevenness or color unevenness may occur in a region close to point light sources in their arrangement direction.

The present invention has been made in view of the above circumstances, and an object of the invention is therefore to provide a surface light source device capable of preventing luminance unevenness and color unevenness from occurring in a region close to point light sources in their arrangement direction and thereby increasing the display quality. In particular, it is an object of the invention to provide a surface light source device capable of preventing light beams emitted from adjoining point light sources from being diffused in their vicinities without being mixed with each other sufficiently.

SUMMARY OF THE INVENTION

A surface light source device according to the invention includes two or more point light sources that are arranged linearly; a light guide plate having an incident surface on which light emitted from each of the point light sources shines, for outputting input light from a front surface thereof; and light diffusing means provided on a back surface of the light guide plate, for diffusing light, wherein the incident surface of the light guide plate is inclined toward a back side.

With this configuration, since the incident surface of the light guide plate is inclined toward the back side, the proportion of light that shines on the incident surface from each point light source and is then refracted toward the front surface can be made larger than in the case that the inclination angle is not inclined toward the back side. Therefore, the quantity of light that travels directly from the incident surface to the light diffusing means provided on the back surface of the light guide plate can be decreased. This makes it possible to prevent light beams emitted from the point light sources from being diffused in their vicinities without being mixed together sufficiently.

In particular, an inclination angle of a back side portion of the incident surface of the light guide plate is larger than that of a front-side portion of the incident surface. This configuration can prevent light beams emitted from the point light sources from being diffused in their vicinities without being mixed together sufficiently, and can also prevent light that is input through a front portion of the incident surface from being output from the light guide plate instead of being totally reflected by a portion, in the vicinity of the point light sources, of the front surface of the light guide plate.

Another surface light source device according to the invention is characterized by, in addition to the above features, a feature that the light guide plate is formed with two or more light source accommodation holes in which the respective point light sources are inserted, and wall surfaces of the light source accommodation holes serve as incident surfaces of the light guide plate, respectively.

Still another surface light source device according to the invention includes two light source units that are opposed to each other, each of the light source units having two or more point light sources that are arranged linearly; and a light guide plate having incident surfaces on which light beams emitted from the light source units shine, respectively, for outputting input light beams from a front surface thereof, wherein the incident surfaces of the light guide plate are inclined toward a back side.

A further surface light source device according to the invention includes two or more point light sources that are arranged linearly; a light guide plate having an incident surface on which light emitted from each of the point light sources shines, for outputting input light from a front surface thereof; and light diffusing means provided on a front surface of the light guide plate, for diffusing light, wherein the incident surface of the light guide plate is inclined toward a front side.

According to the surface light source device according to the invention, since a larger proportion of light that shines on the incident surface from each point light source is refracted toward the front surface, the quantity of light that travels directly from the incident surface to the light diffusing means provided on the back surface of the light guide plate can be decreased. This makes it possible to prevent light beams emitted from the point light sources from being diffused in their vicinities without being mixed together sufficiently, which in turn makes it possible to prevent luminance unevenness and color unevenness from occurring in a region close to the point light sources in their arrangement direction and to thereby increase the display quality.

BRIEF DESCRIPTION OF THE DRAWINGS

FIG. 5 is a sectional view showing the details of an important part of an exemplary surface light source device according to a second embodiment of the invention, and shows an incident surface of a light guide plate 11 that includes two planes that are different in the inclination angle θ;

FIG. 7 is a sectional view showing the details of an important part of an exemplary surface light source device according to a third embodiment of the invention;

FIG. 8 is a sectional view showing the details of an important part of an exemplary surface light source device according to a fourth embodiment of the invention;

DETAILED DESCRIPTION OF THE INVENTION

EMBODIMENT 1

Figure 1:
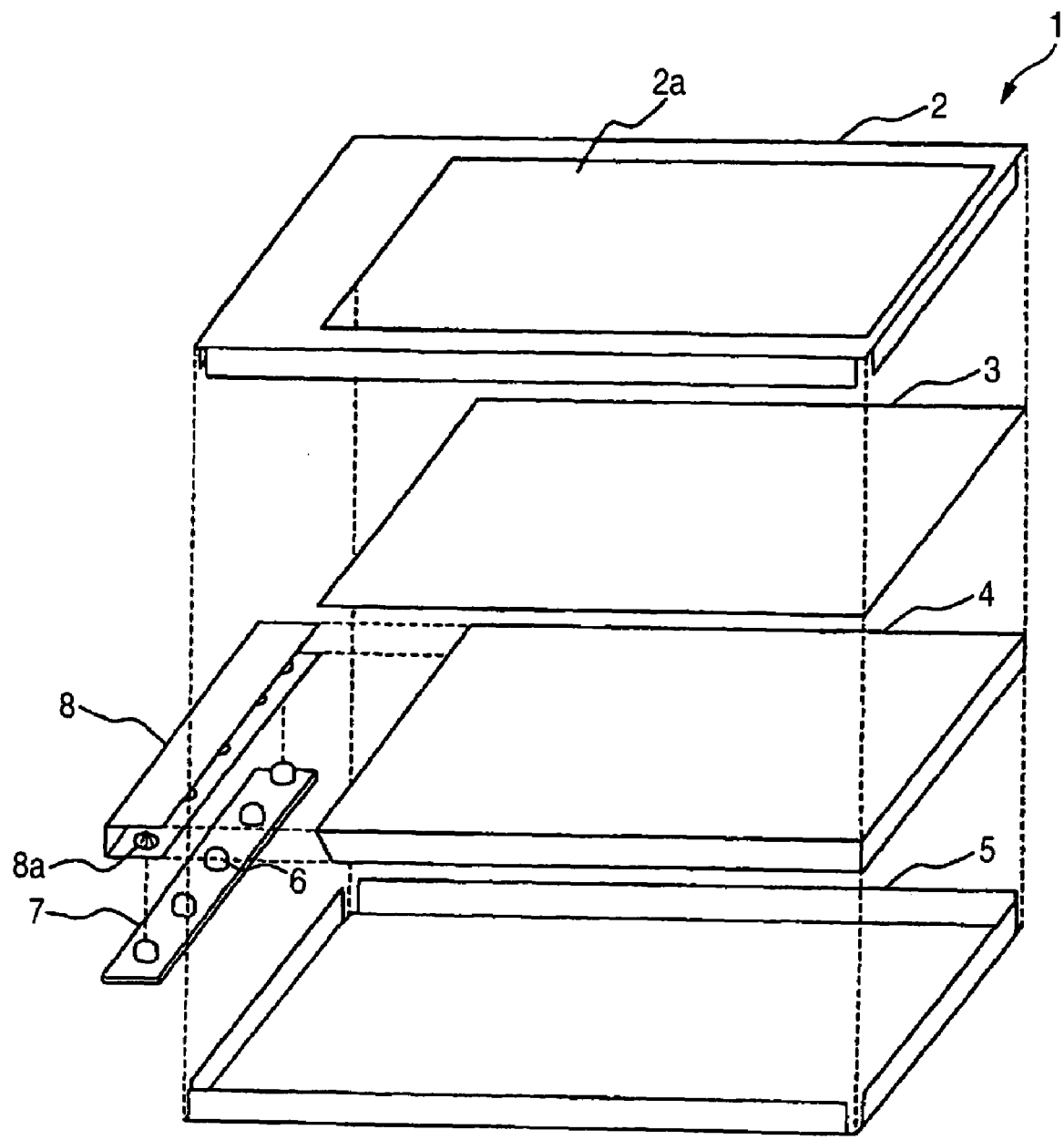
FIG. 1 is an exploded perspective view outlining the configuration of an exemplary surface light source device according to a first embodiment of the present invention.

FIG. 1 is an exploded perspective view outlining the configuration of a surface light source device according to a first embodiment of the present invention. A surface light source device 1 according to this embodiment is a side-light-type surface light source device having a light guide plate 4 that outputs, from its front surface, light that is input from plural LEDs 6 that are arranged linearly. The surface light source device 1 is suitable to illuminate a display panel such as a liquid crystal panel over its entire display area with uniform light. The term "display panel" as used herein means a display device for displaying various kinds of information and encompasses things other than a liquid crystal panel, such as a display board (e.g., signboard).

The surface light source device 1 is composed of a front frame 2, an optical sheet 3, the light guide plate 4, a rear frame 5, and a light source unit. The light source unit is composed of LEDs (light-emitting diodes) 6 as point light sources, an LED board 7 on which the two or more LEDs 6 are arranged linearly, and a reflector 8 for reflecting light that is emitted from the LEDs 6.

LEDs 6 are ones that emit monochrome light beams of R (red), G (green), and B (blue), for example, or ones that emit white light. Where plural kinds of LEDs that emit monochrome light beams of different colors, the hue can be adjusted by controlling the individual LEDs independently. The LEDs 6 are arranged at regular intervals on the LED board 7. The LED board 7 is disposed with its major surface directed to the front side, and the LEDs 6 project from the major surface. In this example, each LED 6 has a light intensity peak in directions parallel with the front surface of the light guide plate 4 and a light distribution in a plane perpendicular to the arrangement direction of the LEDs 6 is dominated by portions corresponding to the side directions.

Two or more through-holes 8a are formed through the reflector 8 so as to correspond to the positions of the respective LEDs 6 on the board. The reflector 8, which is disposed so as to be opposed to one end surface of the light guide plate 4 in a state that the LEDs 6 on the board have been inserted in the respective through-holes 8a from the back side, has a function of outputting, toward the light guide plate 4, light beams emitted from the respective LEDs 6. The reflector 8 is a silver-evaporated plate-like member or a sheet-like member made of a white resin. In particular, from the viewpoint of outputting light emitted from each point light source (LED 6) toward the light guide plate 4 without attenuating it, it is desirable that the reflector 8 be made of a material whose reflectance is 90% or higher.

The front frame 2 is a front-side body for accommodating the optical sheet 3, the light guide plate 4, and the light source unit, and has, on the front side, an opening 2a to serve as an exit area of light that is output from the light guide plate 4. The optical sheet 3 is any of various kinds of sheet members such as a diffusion sheet obtained by converting a transparent resin material to a diffusive, sheet-like member by applying diffusive particles to it or forming fine asperities on its surface or a lens sheet provided with a prism array. If necessary, plural sheet members of the same kind or plural kinds of sheet members may be used in combination. Disposing such an optical sheet 3 in front of the light guide plate 4 makes it possible to make the luminance and chromaticity of light as output from the light guide plate 4 uniform or to obtain a desired luminance distribution in the plane of the opening 2a of the front frame 2.

The light guide plate 4 is a transparent flat plate and has a function of outputting, from its front surface, light that is input through one end surface from a light source unit. More specifically, the light guide plate 4 is a transparent member made of an acrylic resin, polycarbonate, glass, or the like. The back surface of the light guide plate 4 is formed with a diffusion pattern as a light diffusing means for diffusing light traveling through the light guide plate 4. For example, the diffusion pattern is formed by forming fine structures such as line-shaped cuts or dot-shaped recesses or printing a fine pattern on the surface of the light guide plate 4. As such, the diffusion pattern diffusely reflects light traveling through the light guide plate 4.

Light that is input to the light guide plate 4 through its end surface travels through the light guide plate 4 and is output from its front surface. That is, light that has been diffused by the diffusion pattern is output from the front surface as diffused light. Exit light that is uniform in the arrangement direction of the LEDs 6 can be obtained by adjusting the diffusion pattern.

The rear frame 5 is a back side body for accommodating the optical sheet 3, the light guide plate 4, and the light source unit. The front frame 2 and the rear frame 5 are made of a resin or metal member. For example, each of the frames 2 and 5 is made of a metal such as aluminum because it can satisfy required strength and is superior in workability. In particular, aluminum is preferable because it has high thermal conductivity and hence can provide improved heat dissipation.

A reflection film for reflecting light that is output from the light guide plate 4 back to the light guide plate 4 to utilize light more efficiently may be placed or formed on the inside surfaces of each of the frames 2 and 5. The front frame 2 is fit into the rear frame 5 in a state that the optical sheet 3, the light guide plate 4, and the light source unit are accommodated in the front frame 2, whereby the surface light source device 1 is completed.

Figure 2:
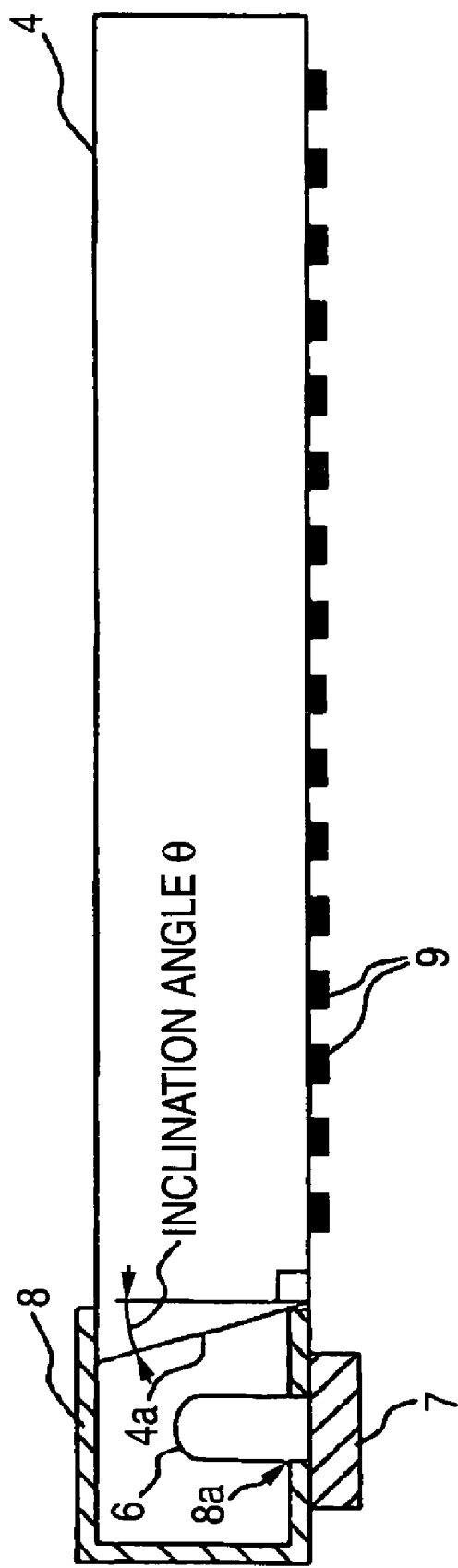
FIG. 2 is a sectional view showing the details (example) of an important part of the surface light source device of FIG. 1, and shows an incident surface 4a of a light guide plate 4 that is formed with a diffusion pattern 9 on its back surface.

FIG. 2 is a sectional view showing the details (example) of an important part of the surface light source device 1 of FIG. 1, and shows an incident surface 4a of the light guide plate 4 that is formed with a diffusion pattern 9 on its back surface. One end surface of the light guide plate 4 serves as an incident surface on which light emitted from each LED 6 shines in the direction parallel with the front surface of the light guide plate 4. The incident surface 4a is inclined toward the back surface of the light guide plate 4. That is, the incident surface 4a is inclined so as to refract, toward the front surface, all light beams that are incident on the incident surface 4a parallel with the front surface of the light guide plate 4.

The inclination angle θ (θ>0) of the incident surface 4a is determined on the basis of the thickness of the light guide plate 4, the distance between the incident surface 4a and the point light sources (LEDs 6), the position of the point light sources in the thickness direction of the light guide plate 4, and other factors. For example, the inclination angle θ is set at such an angle as to refract, toward the front surface, all direct light beams that are incident on the incident surface 4a from the point light sources. That is, the inclination angle θ is set at such an angle as to prevent incident light from directly reaching the diffusion pattern 9 which is formed on the back surface of the light guide plate 4. The term "inclination angle θ" as used herein means an angle formed by the direction (normal direction) perpendicular to the incident surface 4a and the front surface of the light guide plate 4, and is positive if the incident surface 4a is inclined toward the back surface of the light guide plate 4.

Figure 3:
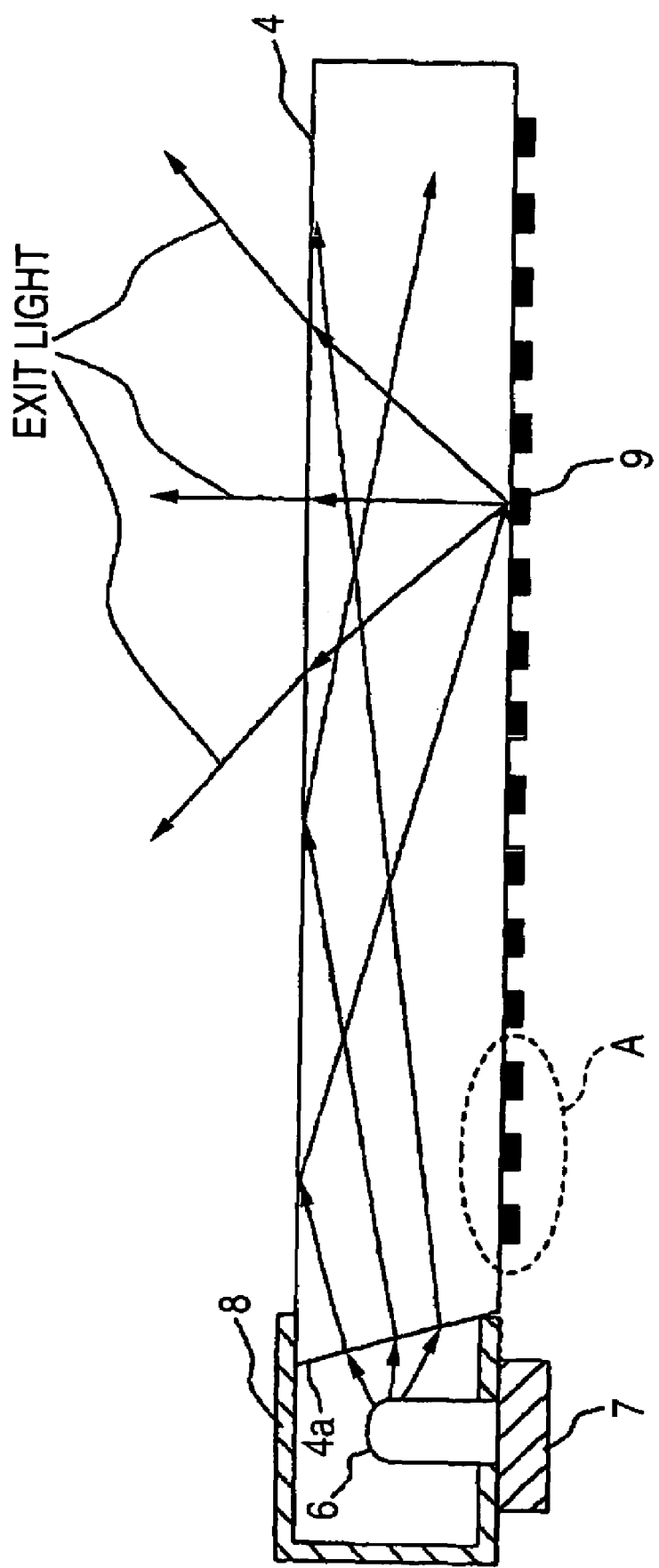
FIG. 3 shows an example of a light exit operation in the surface light source device of FIG. 1.

FIG. 3 shows an example of a light exit operation in the surface light source device of FIG. 1, that is, how light beams that directly shine on the incident surface 4a from each LED 6 travel through the light guide plate 4 and are output through its front surface. Light beams that are directly incident on the incident surface 4a from each LED 6 are refracted toward the front surface of the light guide plate 4 and then diffused by the diffusion pattern 9 that are formed on the light guide plate 4 on the side opposite to the light source unit. That is, the proportion of light that is emitted from each point light source and then refracted toward the front surface is larger than in the case that the inclination angle is equal to 0°, and hence the quantity of light that is diffused by a portion A, in the vicinity of the light source unit, of the diffusion pattern 9 is smaller. This makes it possible to prevent light beams emitted from the point light sources from being diffused in their vicinities without being mixed together sufficiently.

According to this embodiment, the quantity of light that shines on the incident surface 4a from each point light source and then directly reaches the portion A, in the vicinity of the light source unit, of the diffusion pattern 9 is decreased and hence the phenomenon that light beams emitted from the point light sources are diffused in their vicinities without being mixed together sufficiently can be prevented, which in turn prevents luminance unevenness and color unevenness from occurring in a region close to the point light sources in their arrangement direction.

Although the embodiment is directed to the case that the light diffusing means is provided on the back surface of the light guide plate 4, the invention is not limited to such a case. The invention can also be applied to a case that a light diffusing means is provided only on the front side of the light guide plate 4. Where a light diffusing means is provided only on the front side of the light guide plate, the incident surface of the light guide plate is inclined toward the front side.

Figure 4:
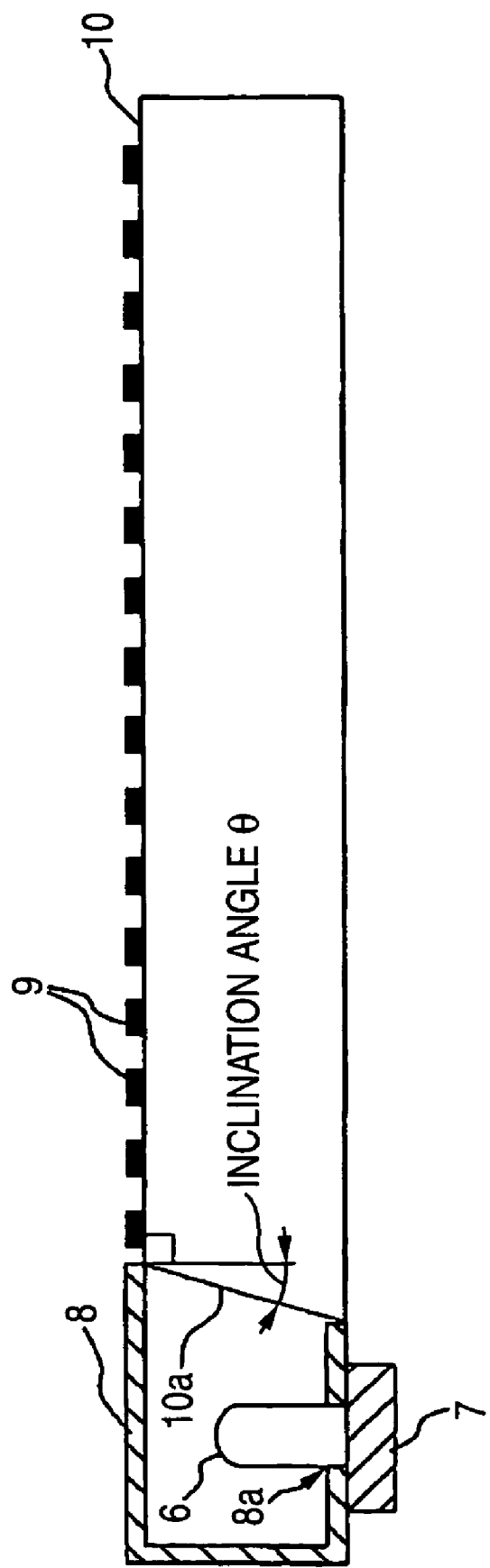
FIG. 4 is a sectional view showing the details of an important part of another exemplary surface light source device according to the first embodiment of the invention, and shows an incident surface 10a of a light guide plate 10 that is formed with a diffusion pattern 9 on its front surface.

FIG. 4 is a sectional view showing the details of an important part of another exemplary surface light source device according to the first embodiment of the invention, and shows an incident surface 10a of a light guide plate 10 that is formed with a diffusion pattern 9 on its front surface. One end surface of the light guide plate 10 is the incident surface 10a, and light emitted from each LED 6 shines on the incident surface 10a in the direction parallel with the front surface of the light guide plate 10. The incident surface 10a is inclined toward the front surface of the light guide plate 10. That is, the incident surface 10a is inclined so as to refract, toward the back surface, all light beams that are incident on the incident surface 10a parallel with the front surface of the light guide plate 10. In this example, the inclination angle θ is positive if the incident surface 10a is inclined toward the front surface of the light guide plate 10.

With this structure, since a larger proportion of light emitted from each point light source is refracted toward the back surface, the quantity of light that is diffused by a portion, in the vicinity of the light source unit, of the diffusion pattern 9 which is formed on the front surface of the light guide plate 10 can be decreased. This prevents the phenomenon that light beams emitted from the point light sources are diffused in their vicinities without being mixed together sufficiently, and hence prevents luminance unevenness and color unevenness from occurring in a region close to the point light sources in their arrangement direction.

Although the embodiment is directed to the case that the light source unit is disposed adjacent to one end surface of the light guide plate 4 or 10, the invention is not limited to such a case. The invention can also be applied to a case that light source units are disposed adjacent to two or more end surfaces of the light guide plate.

EMBODIMENT 2

The first embodiment is directed to the case that the incident surface 4a of the light guide plate 4 is inclined toward the back side. In contrast, a second embodiment is directed to a case that the inclination angle of a back side portion of the incident surface is larger than that of a front-side portion of the incident surface.

FIG. 5 is a sectional view showing the details of an important part of an exemplary surface light source device according to the second embodiment of the invention, and shows an incident surface of a light guide plate 11 that includes two planes that are different in the inclination angle θ. The incident surface of the light guide plate 11 includes two light entrance surfaces 11a and 11b that are different in the inclination angle θ, and the inclination angle θ increases as the position goes away from the front surface of the light guide plate 11. That is, the inclination angle θ of the back side light entrance surface 11b is larger than that of the front-side light entrance surface 11a.

In this example, the inclination angle θ of the front-side light entrance surface 11a is 0°, that is, the front-side light entrance surface 11a is perpendicular to the front surface of the light guide plate 11. For example, a portion of the incident surface that is closer to the front surface of the light guide plate 11 in its thickness direction than the top of each point light source is is made the light entrance surface 11a. This structure makes it possible to effectively decrease the quantity of only light that shines on the incident surface from each point light source and then directly reaches a portion A, in the vicinity of the light source unit, of the diffusion pattern 9.

In the surface light source device of FIG. 2 (first embodiment), if the light distribution of each LED 6 in the plane perpendicular to the arrangement direction of the point light sources has a dominant portion on the front side, there may occur a case that light that is input through a front portion of the incident surface is output instead of being totally reflected by a portion, in the vicinity of the point light sources, of the front surface of the light guide plate 4. In contrast, in the surface light source device according to this embodiment, since the inclination angle θ of the front-side light entrance surface 11a is smaller than that of the back side light entrance surface 11b, light that is incident on a front portion of the incident surface is refracted so as to be directed less to the front surface and hence is prevented from being output instead of being totally reflected by a portion, in the vicinity of the point light sources, of the front surface of the light guide plate 11.

Figure 6A:
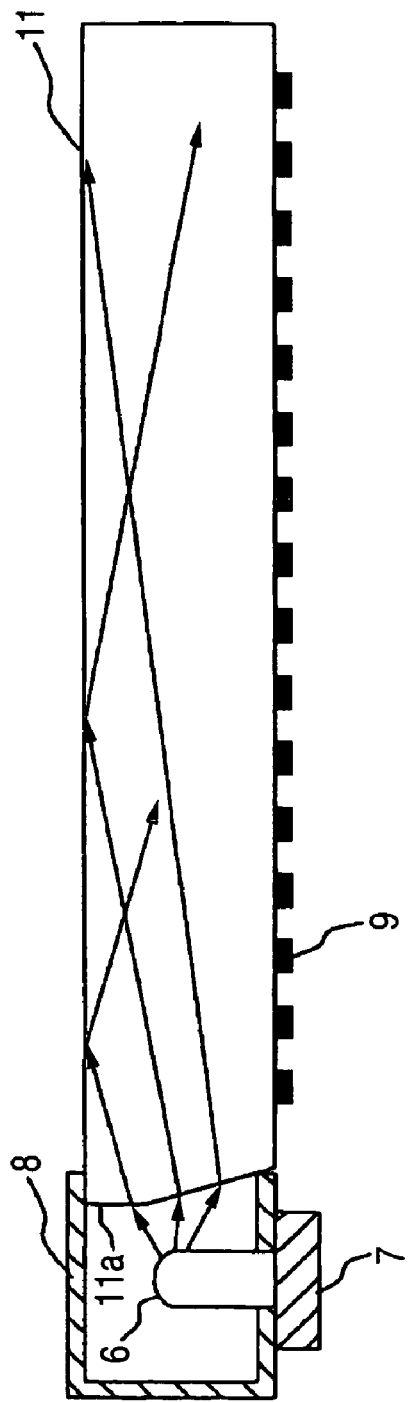
FIGS. 6A and 6B compare an example of a light exit operation of the surface light source device of FIG. 5 with that of a comparative example.
Figure 6B:
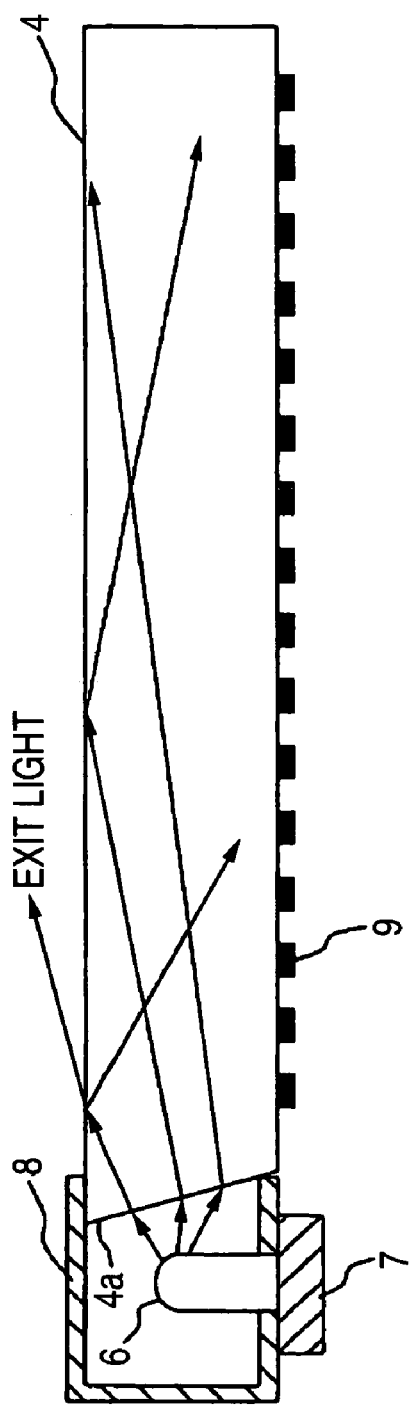

FIGS. 6A and 6B compare an example of a light exit operation of the surface light source device of FIG. 5 with that of a comparative example. FIG. 6A shows how input light beams travels through the light guide plate 11 of this embodiment, and FIG. 6B shows how input light beams travels through the light guide plate 4 of FIG. 2 and part of those are output from a portion close to each point light source (comparative example).

In this embodiment, light beams that directly shine on the light entrance surface 11a from each LED 6 then directly shine on the front surface of the light guide plate 11 at angles that are necessarily larger than or equal to the total reflection angle (critical angle). Therefore, even if the light distribution of each LED 6 has a dominant portion on the front side, the phenomenon that light that is input through a front portion of the incident surface is output from the light guide plate 11 instead of being totally reflected by a portion, in the vicinity of the point light sources, of the front surface of the light guide plate 11 can be prevented.

Although the embodiment is directed to the case that the incident surface of the light guide plate 11 includes the two light entrance surfaces 11a and 11b that are different in the inclination angle θ, the invention is not limited to such a case. The incident surface may include three or more planes that are different in the inclination angle θ.

EMBODIMENT 3

The second embodiment is directed to the case that the incident surface of the light guide plate 11 includes plural planes that are different in the inclination angle θ. In contrast, a third embodiment is directed to a case that the incident surface is a curved surface.

FIG. 7 is a sectional view showing the details of an important part of an exemplary surface light source device according to the third embodiment of the invention, and shows an incident surface 21a of a light guide plate 21 that is a curved surface whose inclination angle θ increases as the position goes away from the front surface of the light guide plate 21. The incident surface 21a of the light guide plate 21 is a curved surface whose inclination angle θ varies continuously, that is, increases as the position goes away from the front surface of the light guide plate 21. The shape of the curved surface of the incident surface 21a is determined in accordance with required display performance. For example, the shape of the curved surface is optimized by an optical simulation so as to increase the uniformity of the luminance and chromaticity and to lower the optical loss. In particular, the curved surface is shaped so as to prevent a phenomenon that light reflected by the incident surface 21a is absorbed in the light source unit, resulting in optical loss.

This embodiment can effectively prevent light beams emitted from the point light sources from being diffused in their vicinities without being mixed together sufficiently, and can also prevent light that is input through a front portion of the incident surface 21a from being output from the light guide plate 21 instead of being totally reflected by a portion, in the vicinity of the point light sources, of the front surface of the light guide plate 21.

EMBODIMENT 4

The first embodiment is directed to the case that the light source unit is disposed adjacent to one end surface of the light guide plate 4 or 10. In contrast, in a fourth embodiment, the invention is applied to a surface light source device in which LEDs are inserted in respective, plural light source accommodation holes that are formed in the light guide plate.

FIG. 8 is a sectional view showing the details of an important part of an exemplary surface light source device according to the fourth embodiment of the invention in which plural light source accommodation holes 32 are formed in a light guide plate 31 and a wall surface 31a of each light source hole 32 is inclined toward the back side. The light guide plate 31 is formed with two or more light source accommodation holes 32 in which the respective LEDs 6 are inserted. The wall surface 31a of each light source accommodation hole 32 serves as an incident surface of the light guide plate 31 on which light emitted from the LED 6 shines.

Since each point light source is accommodated in the associated light source accommodation hole 32, light emitted from the entire circumferential surface of each point light source is input to the light guide plate 31, whereby the optical loss can be reduced. Since the wall surface 31a of each light source accommodation hole 32 is inclined toward the back side, the quantity of light that shines on the incident surface 4a from each point light source and then directly reaches the portion A, in the vicinity of the light source unit, of the diffusion pattern 9 is decreased. This prevents the phenomenon that light beams emitted from the point light sources are diffused in their vicinities of without being mixed together sufficiently, and hence effectively prevents luminance unevenness and color unevenness from occurring in a region close to the point light sources in their arrangement direction.

EMBODIMENT 5

The fourth embodiment is directed to the case that the light source accommodation holes 32 are formed along one end surface of the light guide plate 31. In contrast, in a fifth embodiment, the invention is applied to a surface light source device in which light source accommodation holes are formed along confronting end surfaces of the light guide plate.

Figure 9:
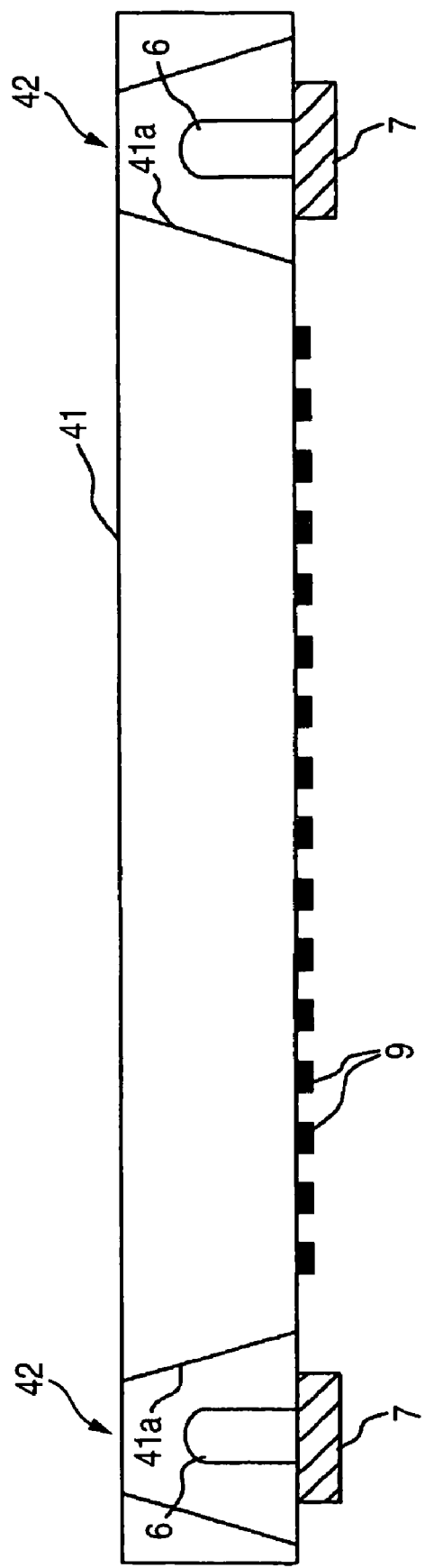
FIG. 9 is a sectional view showing the details of an important part of an exemplary surface light source device according to a fifth embodiment of the invention.

FIG. 9 is a sectional view showing the details of an important part of an exemplary surface light source device according to the fifth embodiment of the invention, and shows how light source accommodation holes 42 are formed along confronting end surfaces of a light guide plate 41. A wall surface 41a of each light source accommodation hole 42 serves as an incident surface of the light guide plate 41 on which light emitted from the LED 6 shines.

Figure 10:
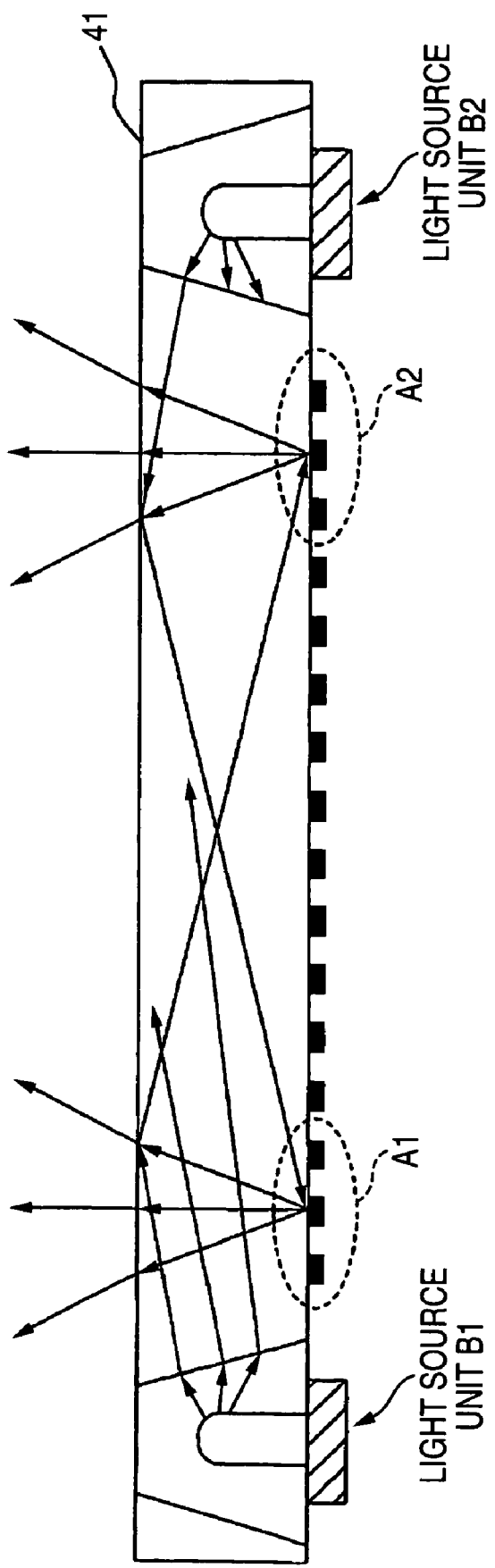
FIG. 10 shows an example of a light exit operation in the surface light source device of FIG. 9.
Figure 11:
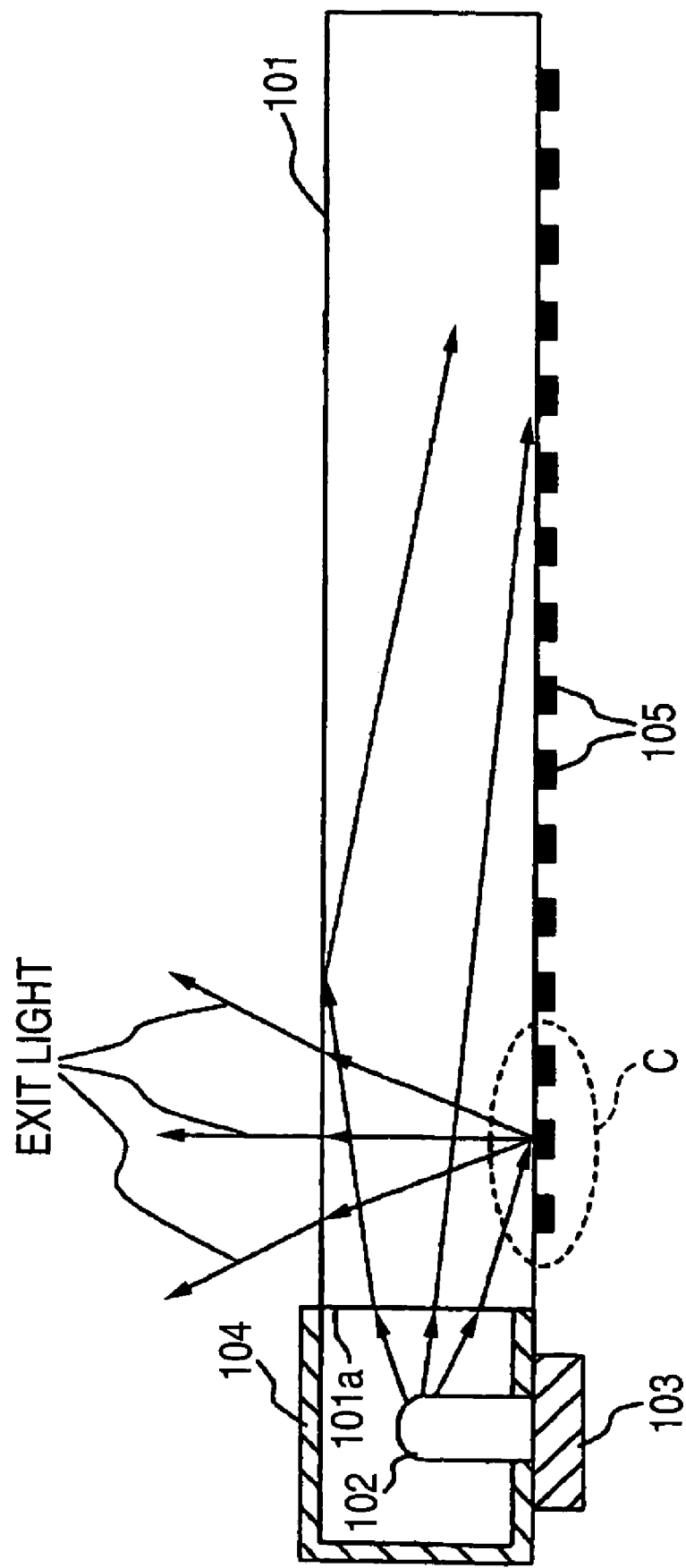
FIG. 11 is a sectional view showing the structure of an important part of a conventional surface light source device.

FIG. 10 shows an example of a light exit operation in the surface light source device of FIG. 9. Light beams that are input to the light guide plate 41 from light source units B1 and B2 that are disposed adjacent to the two respective ends of the light guide plate 41 can be output effectively from the light guide plate 41. That is, whereas the phenomenon that light beams emitted from the point light sources are diffused in their vicinities without being mixed together sufficiently is prevented, light beams emitted from the light source units B1 and B2 can be diffused properly by portions A2 and A1 that are located on the sides opposite to the light source units B1 and B2, respectively. As a result, the exit light is made uniform in the arrangement direction of the point light sources and the direction perpendicular to the arrangement direction. Therefore, a desired luminance distribution and color distribution can be obtained in the direction perpendicular to the arrangement direction of the point light sources whereas luminance unevenness and color unevenness are prevented from occurring in regions close to the point light sources.

What is claimed is:

1. A surface light source device comprising:
two or more point light sources that are arranged linearly;
a light guide plate having a side surface which is an incident surface on which light emitted from each of the point light sources shines, for outputting input light from a front surface thereof; and
light diffusing means provided on a back surface of the light guide plate, for diffusing light,
wherein the incident surface of the light guide plate includes a front side portion closer to the front surface than the back surface, a back side portion closer to the back surface than the front surface, and an inclination angle relative to a plane perpendicular to the front surface, wherein the back side portion of the inclined incident surface of the light guide plate is further from the point light sources than the front side portion of the inclined incident surface, wherein the inclination angle of the back side portion of the incident surface of the light guide plate is larger than the inclination angle of the front-side portion of the incident surface, and wherein the incident surface of the light guide plate includes two or more planes having different inclination angles that increase as the position goes away from the front surface of the light guide plate.

2. The surface light source device according to claim 1, wherein the light guide plate is formed with two or more light source accommodation holes in which the respective point light sources are inserted, and
wall surfaces of the light source accommodation holes serve as incident surfaces of the light guide plate, respectively.

3. A surface light source device comprising:
two or more point light sources that are arranged linearly;
a light guide plate having a side surface which is an incident surface on which light emitted from each of the point light sources shines, for outputting input light from a front surface thereof; and
light diffusing means provided on a back surface of the light guide plate, for diffusing light,
wherein the incident surface of the light guide plate includes a front side portion closer to the front surface than the back surface, a back side portion closer to the back surface than the front surface, and an inclination angle relative to a plane perpendicular to the front surface, wherein the back side portion of the inclined incident surface of the light guide plate is further from the point light sources than the front side portion of the inclined incident surface, wherein the incident surface of the light guide plate includes two or more planes having different inclination angles that increase as the position goes away from the front surface of the light guide plate, and wherein a portion of the incident surface of the light guide plate is closer to the front surface of the light guide plate, in a thickness direction of the light guide plate, than a top of each of the point light sources and is perpendicular to the front surface of the light guide plate.

4. A surface light source device comprising:
two or more point light sources that are arranged linearly;
a light guide plate having a side surface which is an incident surface on which light emitted from each of the point light sources shines, for outputting input light from a front surface thereof; and
light diffusing means provided on a back surface of the light guide plate, for diffusing light,
wherein the incident surface of the light guide plate includes a front side portion closer to the front surface than the back surface, a back side portion closer to the back surface than the front surface, and an inclination angle relative to a plane perpendicular to the front surface, wherein the back side portion of the inclined incident surface of the light guide plate is further from the point light sources than the front side portion of the inclined incident surface, and wherein the incident surface of the light guide plate is a curved surface whose inclination angle varies continuously so as to increase as the position goes away from the front surface of the light guide plate.

* * * * *